United States Patent
Häcker et al.

(10) Patent No.: US 6,987,241 B2
(45) Date of Patent: Jan. 17, 2006

(54) MACHINE TOOL INSTALLATION INCLUDING GATED ENCLOSURE

(75) Inventors: Michael Häcker, Wimsheim (DE); Marcus Busch, Weissach/OT-Flacht (DE); Ralf Schopf, Ditzingen (DE)

(73) Assignee: Trumpf Werkzeugmaschin GmbH + Co. KG, Ditzingen (DE)

( * ) Notice: Subject to any disclaimer, the term of this patent is extended or adjusted under 35 U.S.C. 154(b) by 0 days.

(21) Appl. No.: 10/976,273

(22) Filed: Oct. 28, 2004

(65) Prior Publication Data

US 2005/0095074 A1    May 5, 2005

(30) Foreign Application Priority Data

Nov. 1, 2003    (EP)    ................................ 03025072

(51) Int. Cl.
*B23C 9/00* (2006.01)
*B23Q 11/08* (2006.01)
*B23K 26/12* (2006.01)
*B23K 26/00* (2006.01)

(52) U.S. Cl. ........................ 219/121.86; 29/DIG. 56; 74/608; 160/222; 219/121.67; 409/134

(58) Field of Classification Search ................ 409/134, 409/235, 137; 408/241 G, 234; 451/451, 451/457; 29/DIG. 56, DIG. 59, DIG. 60; 74/608–609, 612; 160/222–223, 202, 218, 160/220; 219/121.67, 121.86
See application file for complete search history.

(56) References Cited

U.S. PATENT DOCUMENTS

| 4,226,322 | A | * | 10/1980 | Peris | ........................ 192/135 |
|---|---|---|---|---|---|
| 4,576,069 | A | * | 3/1986 | Bazuin | ........................ 82/121 |
| 4,597,698 | A | | 7/1986 | Liebetrau | |
| 5,178,499 | A | * | 1/1993 | Umeda et al. | .............. 409/134 |
| 5,265,497 | A | * | 11/1993 | Curless | ........................ 74/608 |
| D377,945 | S | * | 2/1997 | Bornhorst et al. | ........... D18/57 |
| 6,325,195 | B1 | * | 12/2001 | Doherty | ....................... 160/24 |
| 6,457,918 | B1 | * | 10/2002 | Green | ........................ 409/134 |
| 6,749,495 | B2 | * | 6/2004 | Grund et al. | ............... 451/451 |
| 2003/0183635 | A1 | | 10/2003 | Fujii et al. | |

FOREIGN PATENT DOCUMENTS

| DE | 3513944 A1 | 10/1986 |
|---|---|---|
| DE | 3635900 A1 | 5/1988 |
| DE | 29617118 U1 | 11/1996 |
| DE | 100 20804 A1 | 11/2001 |
| JP | 11-048083 A | * 2/1999 |
| JP | 11-070440 A | * 3/1999 |
| JP | 2001-276992 A | * 10/2001 |
| WO | WO 98/52715 A1 | * 11/1998 |

* cited by examiner

*Primary Examiner*—Erica Cadugan

(57) ABSTRACT

A machine tool installation (1) for the processing of workpieces includes encompasses a work area (4) for the machining of workpieces and contains a workpiece support (13), a work area enclosure (3) featuring a gate (7) and at least one corresponding door segment (6/1, 6/2, 6/3) which can be moved in the horizontal direction between open and closed positions and is supported on the substructure of the machine installation (1) in horizontally movable fashion. Provided above the substructure of the machine tool installation (1), and attached solely to the workpiece support (13) is at least one stationary guide element (14, 15) for the door segments (6/1, 6/2, 6/3) and extending over at least part of the width of the gate.

18 Claims, 12 Drawing Sheets

MACHINE TOOL INSTALLATION INCLUDING GATED ENCLOSURE

BACKGROUND OF THE INVENTION

This invention relates to a machine tool installation for the processing of workpieces with a workpiece-processing work area, a work support and a work area closure featuring a gate with at least one associated door element horizontally movable between open and closed position. In its open position the gate of the work area closure is at least partially accessible, while in its closed position the gate is at least partially closed, and the door element is guided in its movement by at least one stationary guide element that extends in the direction of travel of the door element across at least part of the width of the gate.

For reasons of operator safety as well as for avoiding interference by extraneous factors, it is necessary in many cases to secure or close access to the work area of workpiece machining tool at least during the actual machining process. Nevertheless, it must be possible, prior to the start of the machining process, to access the work area whenever necessary, for instance when the workpiece support inside the work area is to be loaded with a workpiece. To that effect, work areas are provided with closures of the aforementioned type, whose gates can be selectively opened or closed.

An installation of this general type has been described in DE 35 13 944 A1. That prior art system is a machine tool with an enclosure whose gate can be blocked by means of a multi-segment sliding door. The segments of the sliding door of that earlier machine tool installation travel in a horizontal direction on guide elements provided on the machine bed which itself sits on the substructure of the machine tool. A work support in the form of a worktable is positioned inside the work area of the machine tool at a distance from the machine bed. When the sliding door is opened, the work table can be accessed on the machine bed. Directly above the substructure of the machine tool, the machine bed blocks an access port to the work area.

It is the objective of this invention to provide a novel machine tool installation with a gated enclosure providing good accessibility to the work area.

Another object is to provide such a machine tool installation in which the door segments may be moved easily into closing and open positions respectively fully blocking access and providing essentially unobstructed access.

SUMMARY OF THE INVENTION

The invention provides at least one door to be supported directly on the substructure of the machine installation. At the bottom of the door obviates the need for door guides which, if nothing else, would complicate access to the work area. Particularly dispensable are bottom tracks which, whether mounted on top of or recessed in the substructure, would be an obstruction. According to the invention, stationary guides for the door elements are provided only on the work support above the substructure within the machine configuration so that access to the work support is not blocked or made difficult by guides positioned on the gate side opposite the work support. Overall, the result is a work area closure whose gate is totally unobstructed from the substructure of the machine configuration all the way to the top. However, the support and guide design of this invention still permits positive, functionally reliable movement of the door element(s) between the open and the closed positions.

The door is guided along a vertical base, which provides a stable bearing for the door element even as it travels along its opening and closing path.

Stable and thus functionally reliable operation is provided because the fixed lateral support stabilizes the door elements especially during their movement.

Connecting the door elements to the fixed segment of the work area closure is particularly simple when the fixed lateral support is in the form of a passage boundary member in the work area closure which is situated directly next to the door elements that are supported and guided.

In the installation, a stable, functionally reliable support and guide is provided for at least one door segment by means of a relatively small dimension lateral mounting member. The door segments are guided not directly along the fixed lateral support but by at least one telescoping guide. The fixed lateral support only provides for attaching the minimum of one telescoping guide rather than a guide track for a door segment which, for stability considerations, would otherwise have required the broadest possible base in the direction of travel of the door segment.

Thus, a door segment that is connected to the gate boundary member by at least one telescoping guide can be moved into an open position in which it laterally clears the gate of the work area closure to at least a nearly completely unobstructed opening.

If the site of machine is one in which the substructure sits on a base that does not extend in an ideal, horizontally level plane, the components permit mutually complementary or individual height adjustments. The multiple door elements for the gate of the work area closure are mutually offset in the direction perpendicular to their principal plane and can be telescoped into their open and closed positions. At least one door element is guided in the direction of travel on another door element, preferably in juxtaposition with it across its principal plane. For simplicity's sake, only that door element is attached to a fixed lateral mount, preferably to a lateral gate boundary member in the work area closure which is closest to the lateral mount or lateral gate boundary member, as the case may be.

BRIEF DESCRIPTION OF THE DRAWINGS

The following will explain this invention in more detail with the aid of examples schematically illustrated in the attached drawings.

DETAILED DESCRIPTION OF THE ILLUSTRATED EMBODIMENT

Figure 1:
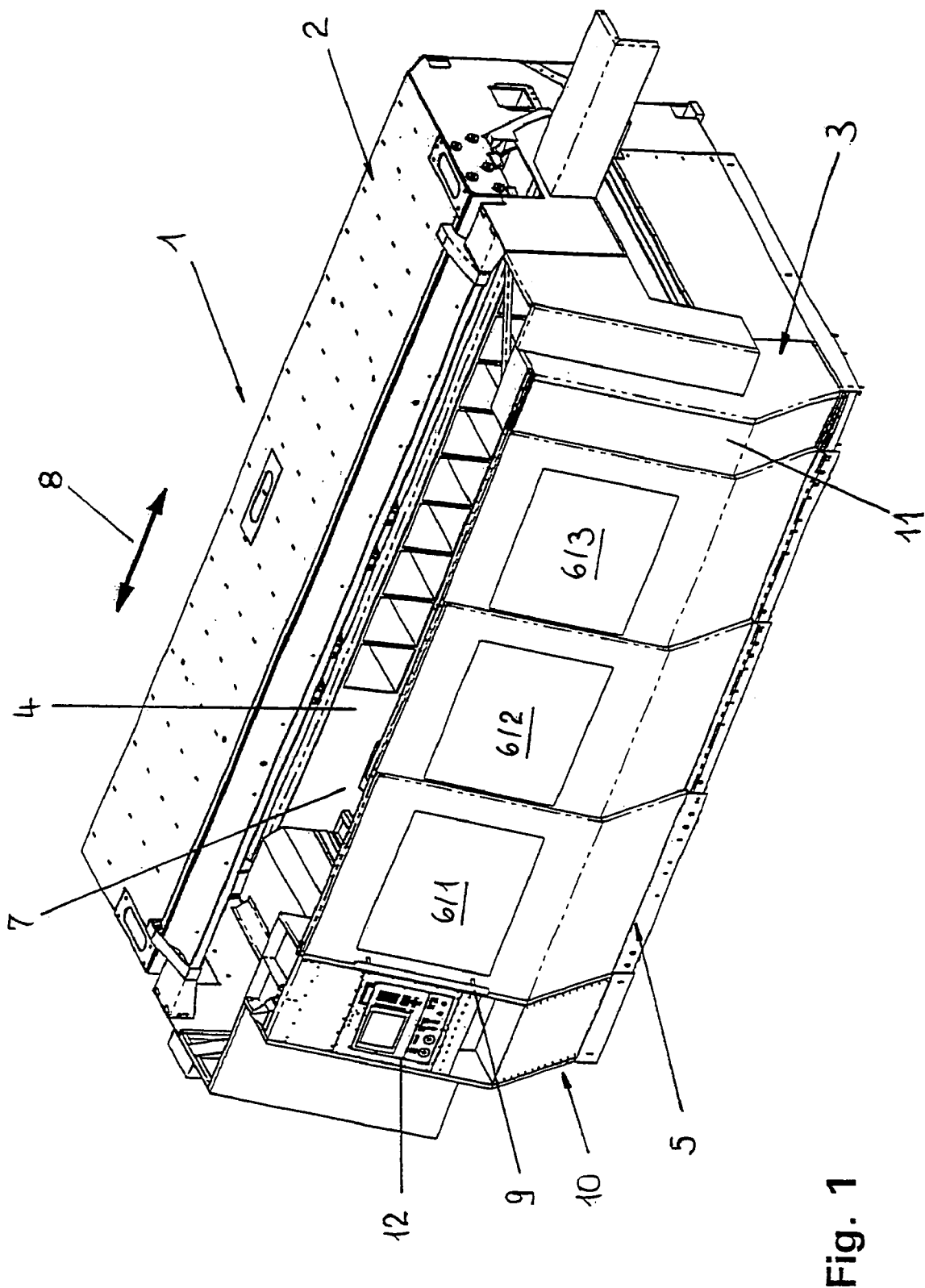
FIG. 1 is a perspective view of a laser machine tool installation incorporating a work area closure embodying the present invention and illustrating the sliding door elements in closed position.

As shown in FIG. 1, a machine system in the form of a laser machine tool installation generally designated by the numeral 1 has a machine frame generally designated by the numeral 2 as well as a work area enclosure generally designated by the numeral 3. The work area enclosure 3 closes a work area 4 of the laser machine tool 1 along its side that would otherwise be open. It features a sliding door 5 which consists of interlocking elements in the form of three door segments 6/1, 6/2, 6/3.

The sliding door 5 serves to close the gate 7 in the work area enclosure 3. The door segments 6/1, 6/2, 6/3 can be manually moved in the direction indicated by a double arrow 8. In a plane transverse to their principal plane, the door segments 6/1, 6/2, 6/3 are mutually offset. In telescoping fashion, they can be moved in either direction of the double arrow 8. The outermost door segment 6/1 is equipped with a handle 9.

The gate 7 of the work area closure 3 is laterally flanked by a fixed left-hand frame member 10 and, respectively, by a fixed right-hand frame member 11. Integrated into the left-hand frame member 10 is a control panel 12 for the laser machine tool installation 1. The door segments 6/1, 6/2, 6/3 are provided with transparent polycarbonate windows indicated by the rectangular outlines. When closed, the door segments 6/1, 6/2, 6/3 securely prevent the laser beam or scattered radiation from leaving the interior of the work area 4, thereby meeting the applicable safety standards (such as VBG 093). This makes the entire configuration a safety class II laser system.

Figure 2:
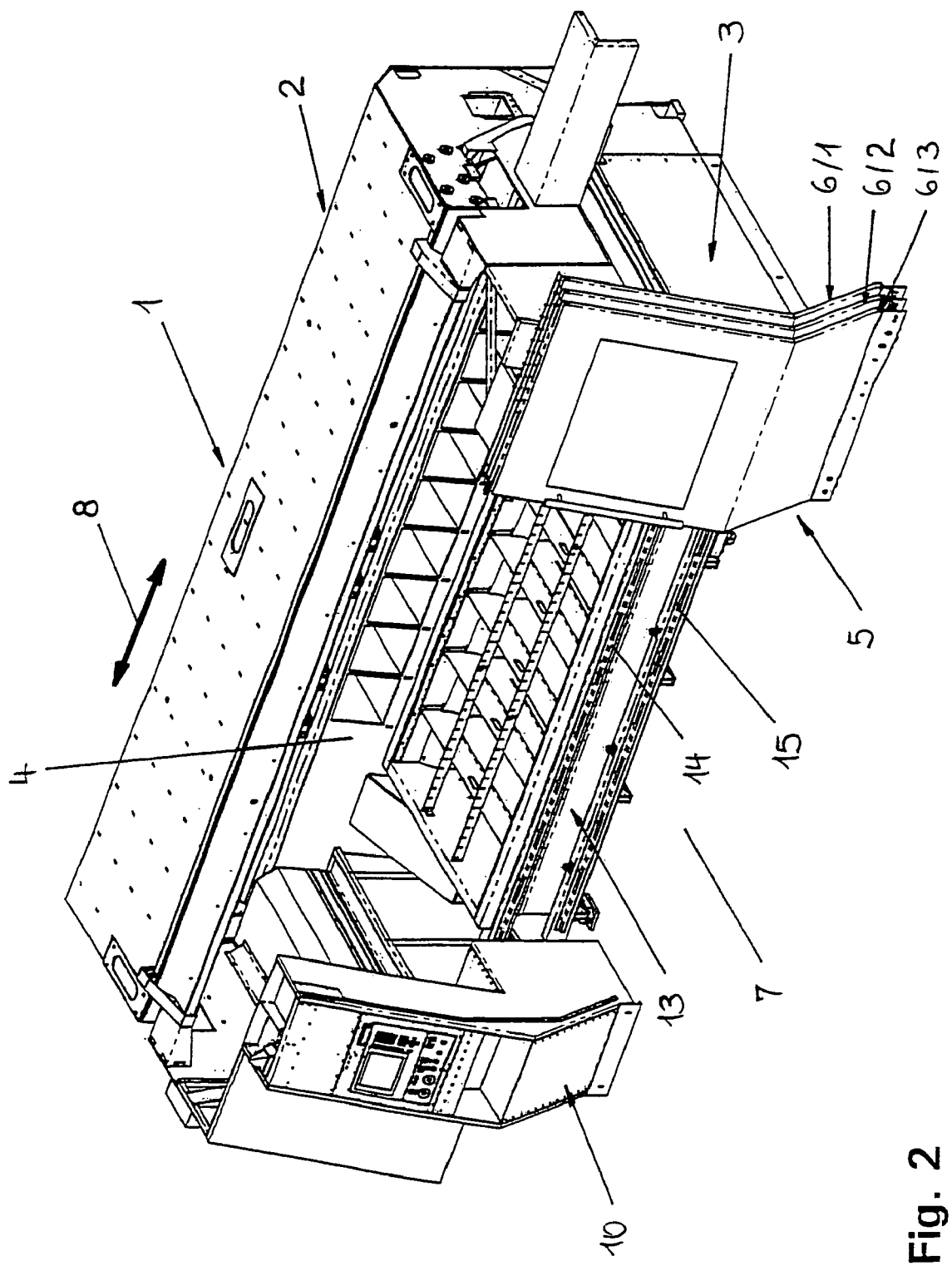
FIG. 2 shows the laser machine tool installation of FIG. 1, with the sliding door elements in its open position.

FIG. 2, with the sliding door 5 open, shows a metal base or frame serving as the work support 13 inside the work area 4. In the example illustrated, the work support 13 is not connected to the machine frame 2. As an alternative, however, the work support 13 may be firmly connected to the machine frame 2.

On its upper surface the work support 13 supports workpieces in conventional fashion. For simplicity's sake, the illustrations do not show the laser cutting head that can be moved along the machine frame 2 for pattern cutting. On its outer end facing the gate 7 of the work area enclosure 3, the work support 13 has mounted thereon guide elements in the form of guide tracks 14, 15 that are mutually offset in the vertical direction.

Figure 3:
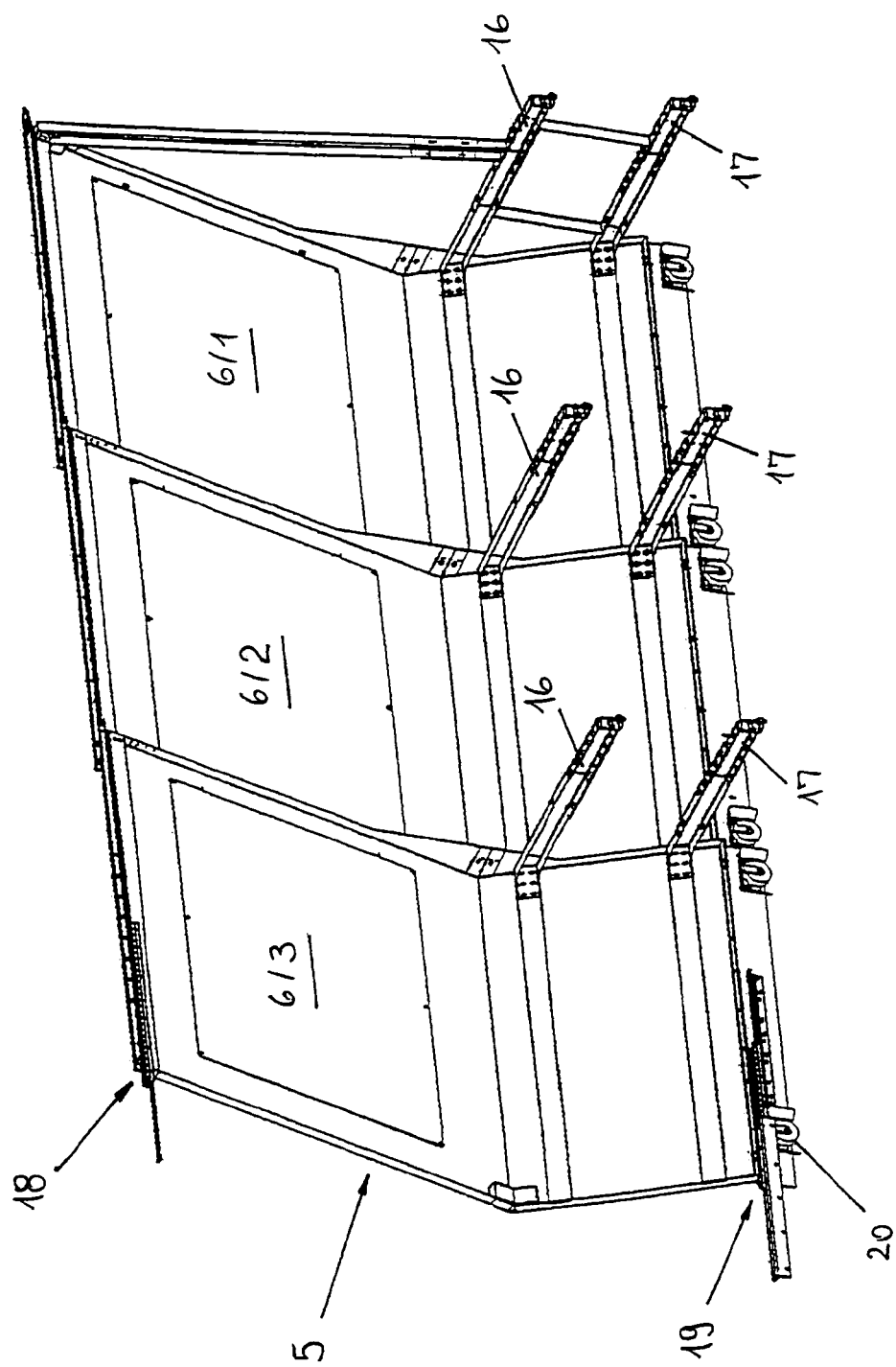
FIG. 3 is a detailed illustration of the sliding door in FIGS. 1 and 2, as viewed from the work area.

The door segments 6/1, 6/2, 6/3 can be moved along the guide tracks 14, 15 in the direction of the double arrow 8 by means of upper guide arms 16 and lower guide arms 17 seen in FIG. 3 which are positioned on the side of and movable with the door segments 6/1, 6/2, 6/3.

Mounted on the upper rim of door segment 6/3 is an upper telescoping guide 18 and a lower telescoping guide 19 is attached to the bottom rim of door segment 6/3. The configuration and function of the telescoping guides 18, 19 will be explained in detail hereinafter.

Rollers 20 on the bottom edge of all door segments 6/1, 6/2, 6/3 are in direct contact with the substructure of the laser machine installation tool 1. To protect the roller bearings from dirt, wiper strips (not shown) are provided on both sides of the rollers 20 in their direction of travel.

Figure 4:
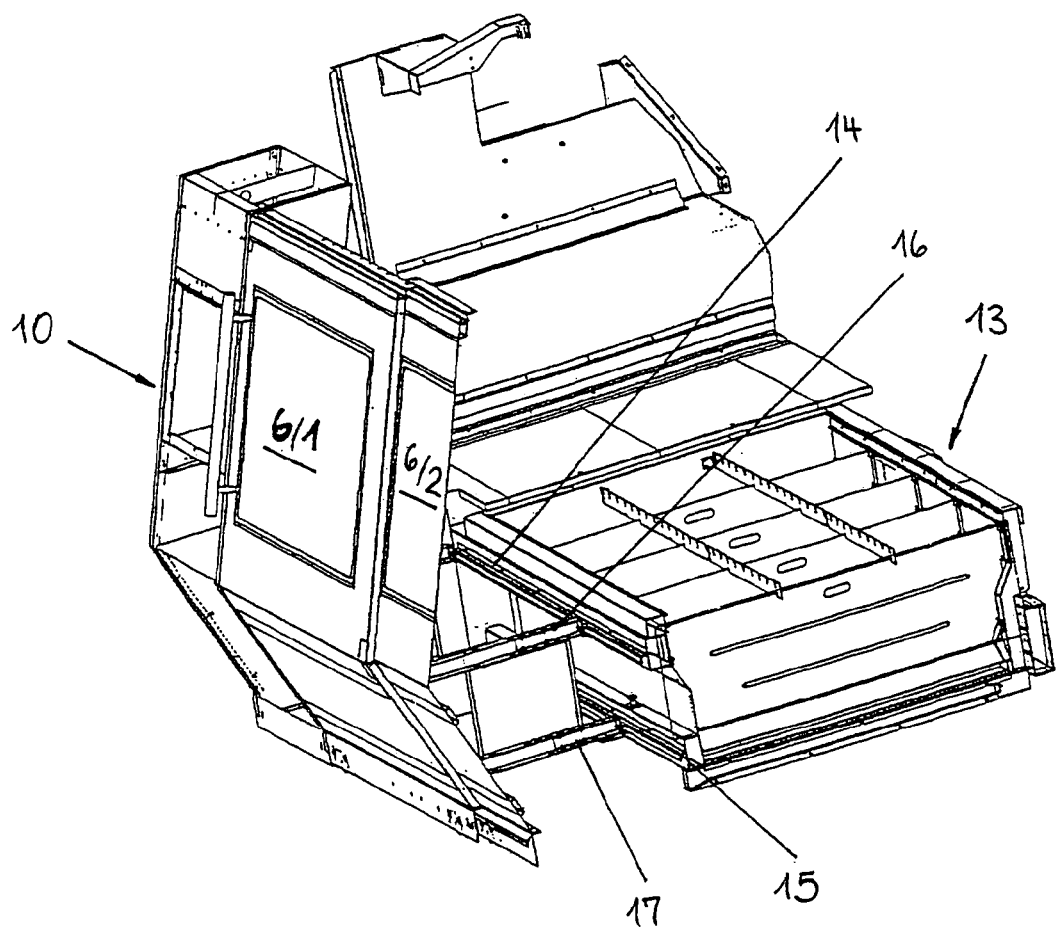
FIGS. 4 and 5 show the manner in which the sliding door elements of FIGS. 1 to 3 are guided on the workpiece plate support in the work area.
Figure 5:
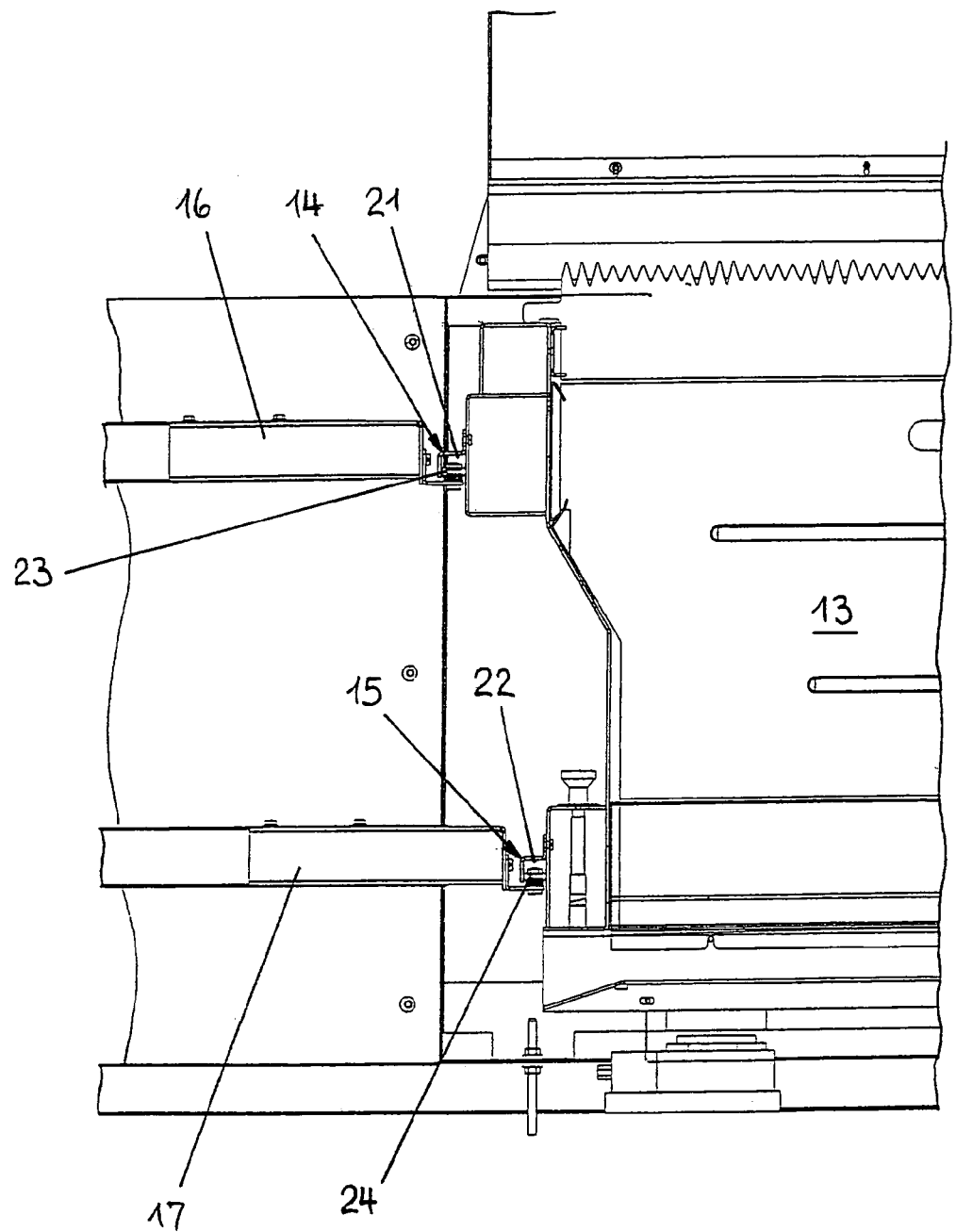

FIGS. 4 and 5 illustrate in detail the guides provided for the door segments 6/1, 6/2, 6/3 on the workpiece support 13. FIG. 4 shows the guides provided only for door segment 6/1; identical provisions are made for door segments 6/2 and 6/3.

As shown in FIGS. 4 and 5, the guide tracks 14, 15 have a double-angled profile. One vertical leg of the profile of the guide tracks 14, 15 is bolted to the workpiece support 13. A horizontal leg of the profile extending from the vertical leg of the profile that serves for the attachment to the workpiece support 13, and another vertical leg of the profile that extends downwardly from the horizontal leg of the profile, delimit, in each case jointly with one wall of the workpiece support 13, the guide channels 21, 22 that extend in the direction of travel 8 of the door segments 6/1, 6/2, 6/3. Guide rollers 23 on the upper guide arms 16 of the door segments 6/1, 6/2, 6/3 engage in the upper guide channel 21. Similarly, guide rollers 24 provided on the lower guide arms 17 of the door segments 6/1, 6/2, 6/3 engage in the guide channel 22. The mutually vertical offset between the horizontal guides assures stability of the door segments 6/1, 6/2, 6/3 in a vertical plane.

As can be seen in FIG. 5, the upper guide rollers 23 as well as the lower guide rollers 24 have a certain amount of vertical clearance in their respective guide channels 21, 22. This vertical clearance allows for compensation for uneven spots on the substructure or floor supporting the rollers 20 in the laser machine tool installation 1 during the movement of the door segments 6/1, 6/2, 6/3. Such height adjustment does not negatively affect the horizontal travel of the door segments 6/1, 6/2, 6/3 on the workpiece support 13.

FIGS. 6 to 9 show the configuration and function of the upper telescoping guide 18 as well as the design concept for the relative positioning of the door segments 6/1, 6/2, 6/3.

In this case, the upper telescoping guide 18 is composed of three telescope elements. One telescope element in the form of a telescope track 25 is screw-mounted to the top of the right-hand gate boundary member 11. Another telescoping element in the form of a telescoping track 26 connects to the door segment 6/3 by an angle section element or bracket 27. Finally, a third telescoping element serving as the telescoping guide section 28 is positioned between the telescoping tracks 25 and 26. The telescoping tracks 25, 26 and the telescoping guide section 28 can be moved relative to one another in the direction of travel 8 of the door segments 6/1, 6/2, 6/3. This makes the upper telescoping guide 18 telescopable in this direction.

Figure 8:
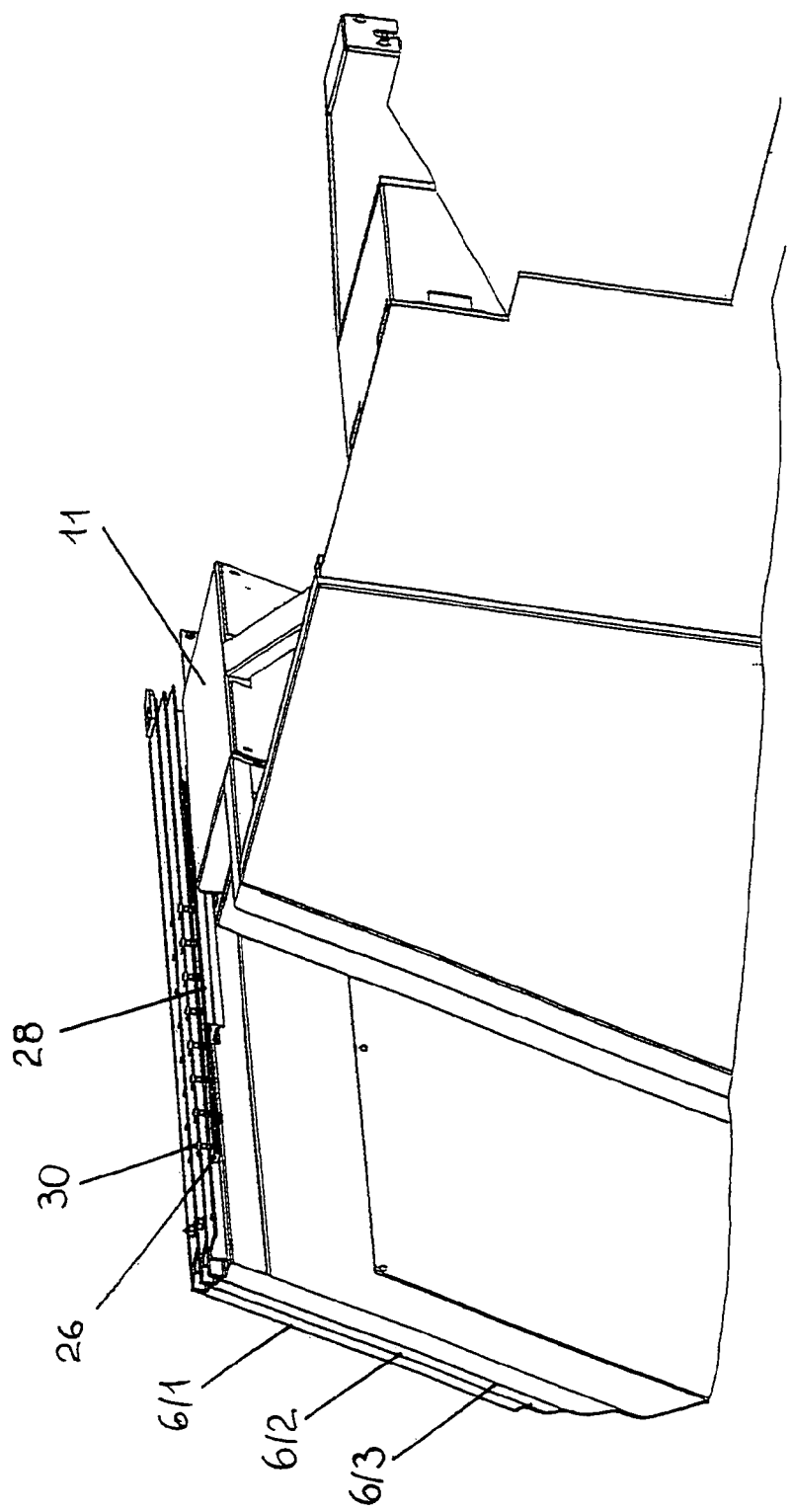

As shown in FIG. 8, the telescoping track 26 that is connected to door segment 6/3 can be moved in the opening direction of the door segments 6/1, 6/2, 6/3 beyond the telescoping track 25 that is mounted on the right-hand gate boundary member 11. This in turn makes it possible to move the door segment 6/3, and, with it, the door segments 6/1 and 6/2, into an open position in which the gate 7 of the work area closure 3 is almost completely clear of obstructing components and fully accessible. In the direction of travel 8 of the door segments 6/1, 6/2, 6/3, the right-hand gate boundary member 11 can be of minimal width, thus merely constituting a small interference contour that hardly restricts access to the work area 4. In the example illustrated, the right-hand gate boundary member 11 is smaller in width than the individual door segments 6/1, 6/2, 6/3. Since the lateral gate boundary member 11 doubles as the lateral termination of the forward wall of the work area closure 3, the work area closure 3 is of relatively small width notwithstanding the considerable gate width. An extensive unobstructed space thus remains on the side of the work area closure 3.

Figure 9:
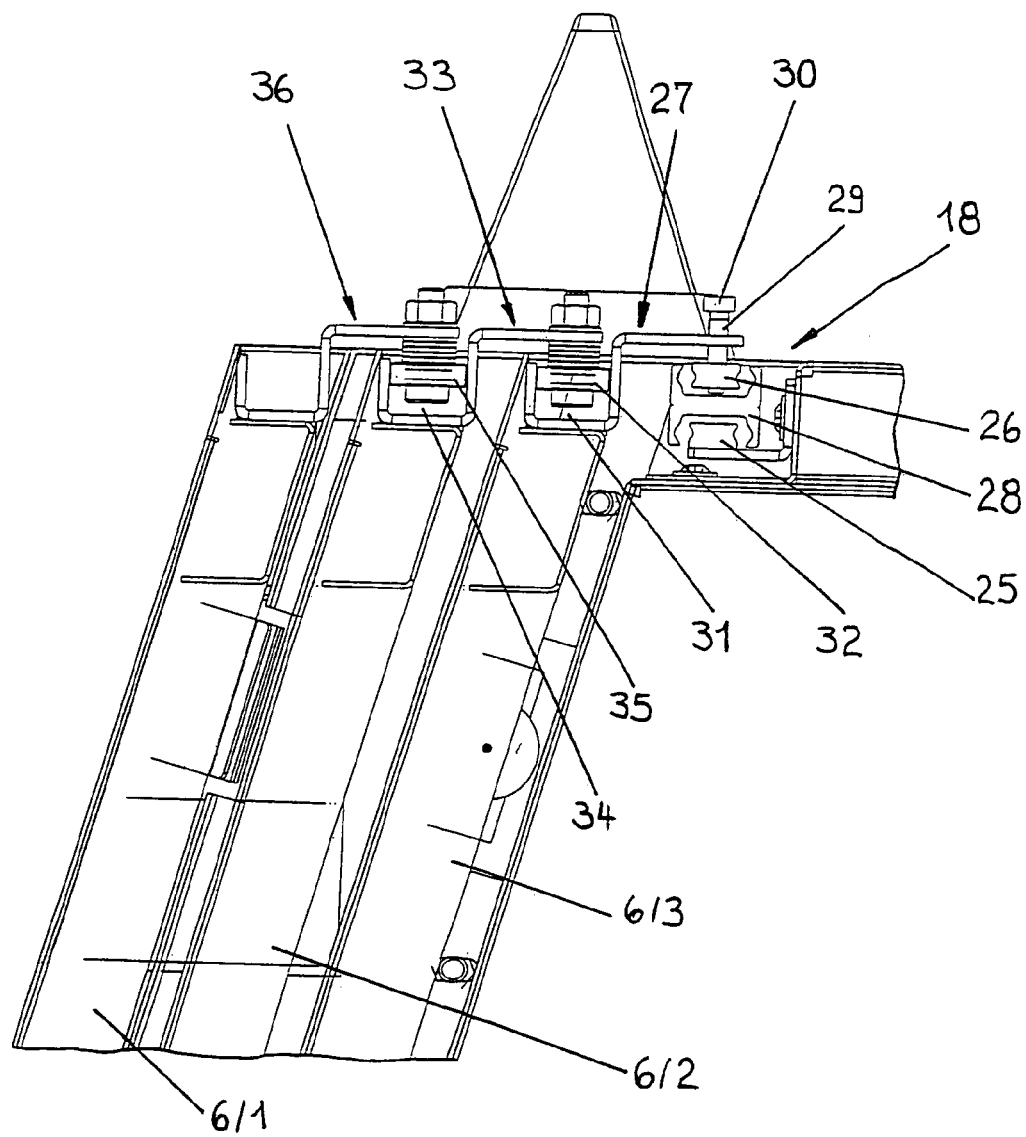

As can be seen especially in FIG. 9, there is some space left in the connection between the angle element 27 on the upper rim of door segment 6/3 and the telescoping track 26. To that effect, the shanks 29 of connecting bolts 30 extend through apertures in the horizontal leg of the angled profile element 27 with a smooth shaft section that engages in vertically movable fashion in the aperture on the angle element 27. The vertical play thus created permits a vertical shift of the door segment 6/3 and, correspondingly, of door segments 6/1 and 6/2 relative to the fixed right-hand gate boundary member 11. This vertical play of the door segments 6/1, 6/2, 6/3 again serves to compensate for uneven spots on the substructure or floor of the laser machine tool installation 1 and between the contact surface and the rollers 20 on the bottom rim of the door segments 6/1, 6/2, 6/3.

Figure 6:
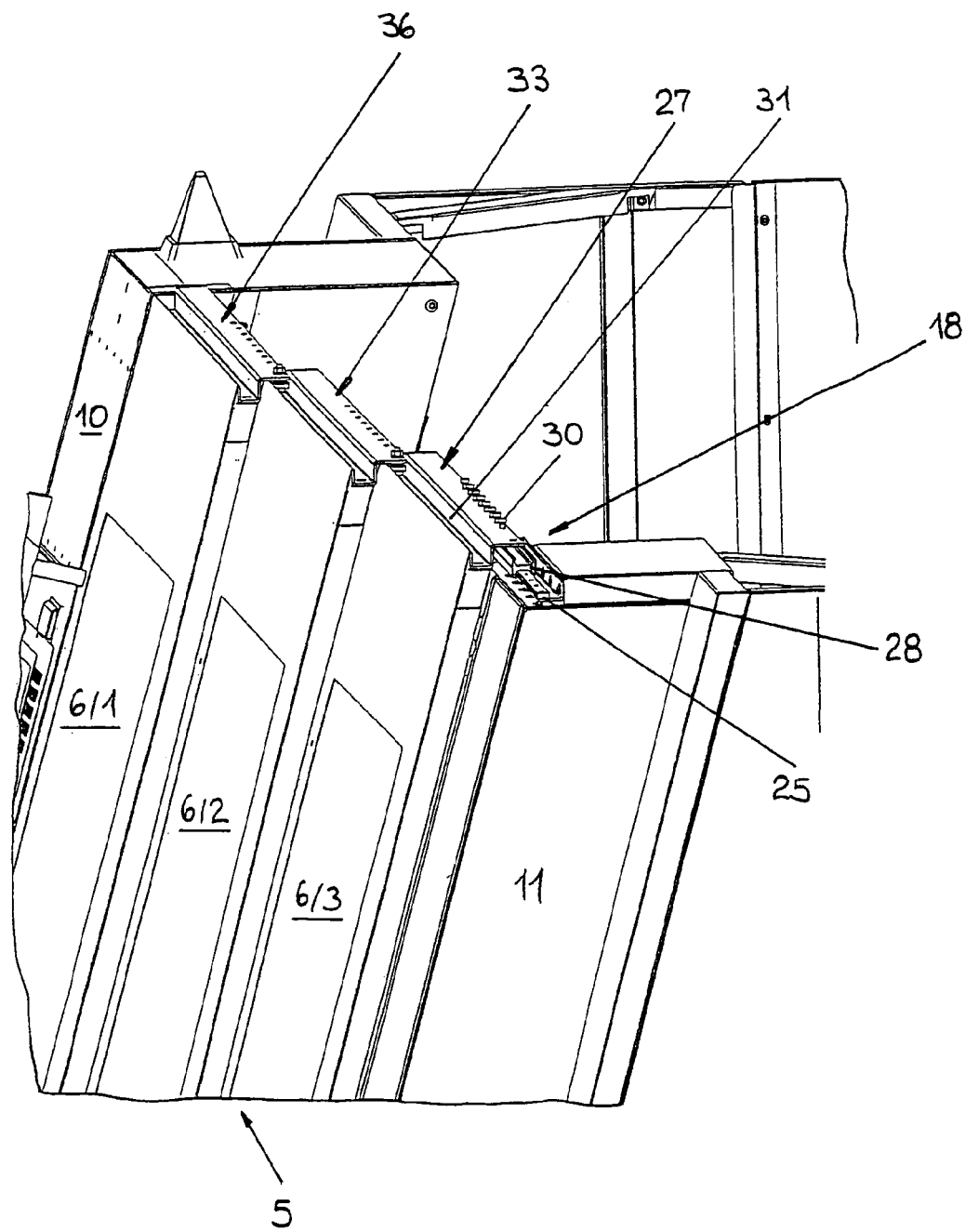
FIGS. 6 to 9 are illustrations of the guides on the upper edge of the sliding door elements of FIGS. 1 to 3.
Figure 7:
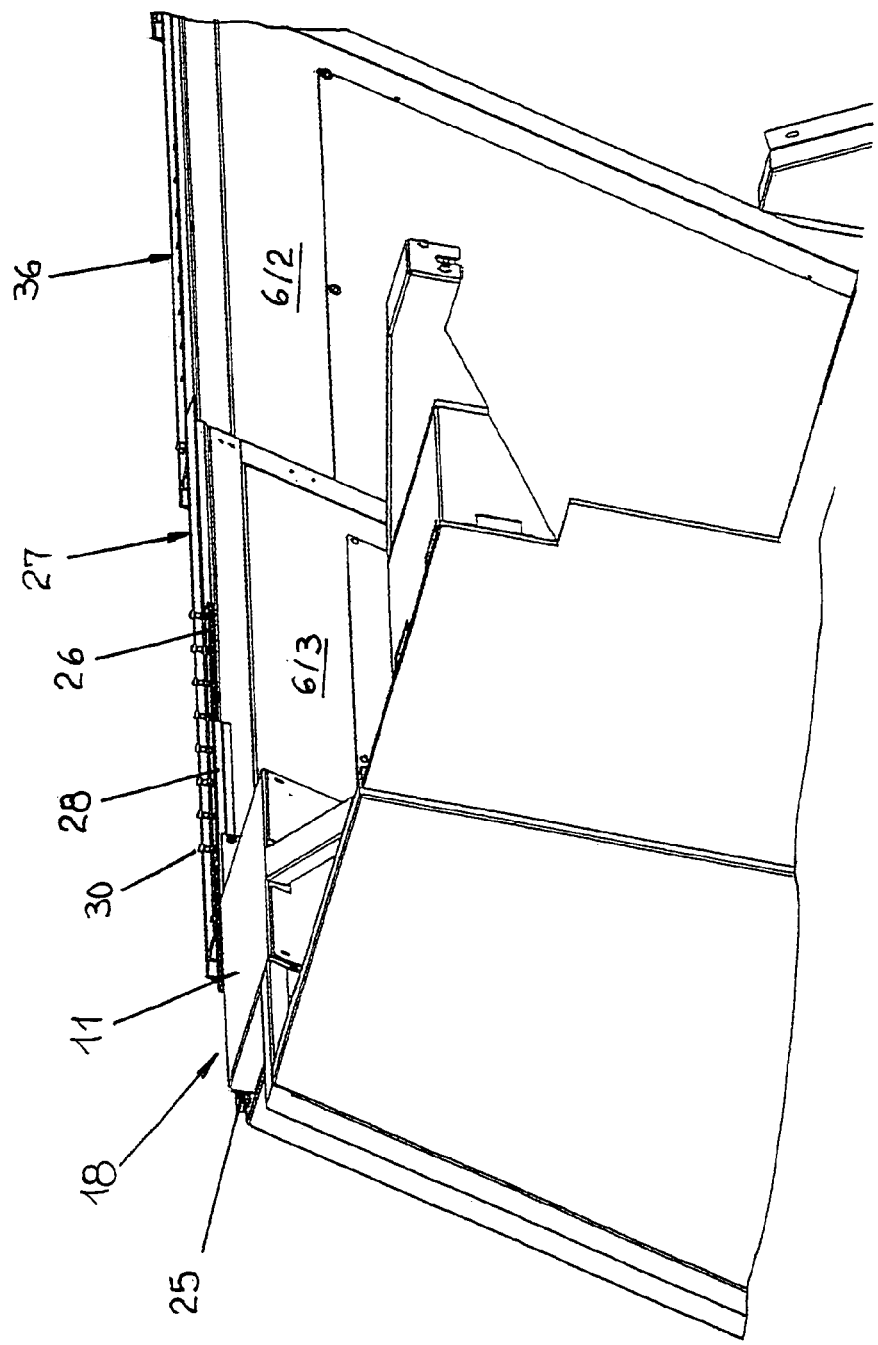

As is evident especially in FIGS. 6 and 9, the angled profile element 27 on the upper rim of door segment 6/3 features not only the connection of one leg with the upper telescoping guide 18 but also a guide chamber 31 that extends in the direction of travel 8. Guide rollers 32, on their part rotatably mounted on an angle-profile element 33 that is connected to the upper rim of door segment 6/2, engage in the guide chamber 31 of the angled element 27.

In the same way as the angle profile element 27, the angle profile element 33 also forms a guide chamber 34. Guide rollers 35, mounted on an angle profile element 36 that is fastened to the door segment 6/1, engage in the guide chamber 34.

The combined functions of guide rollers 35 and angle profile element 33 cause the door segment 6/1 to move alongside door segment 6/2; in similar fashion, the guide rollers 32 and the angle element 27 combine to move the door segment 6/2 alongside door segment 6/3.

The conditions on the upper rim of door segments 6/1, 6/2, 6/3 are matched by the conditions on the lower rim of these segments.

Figure 10:
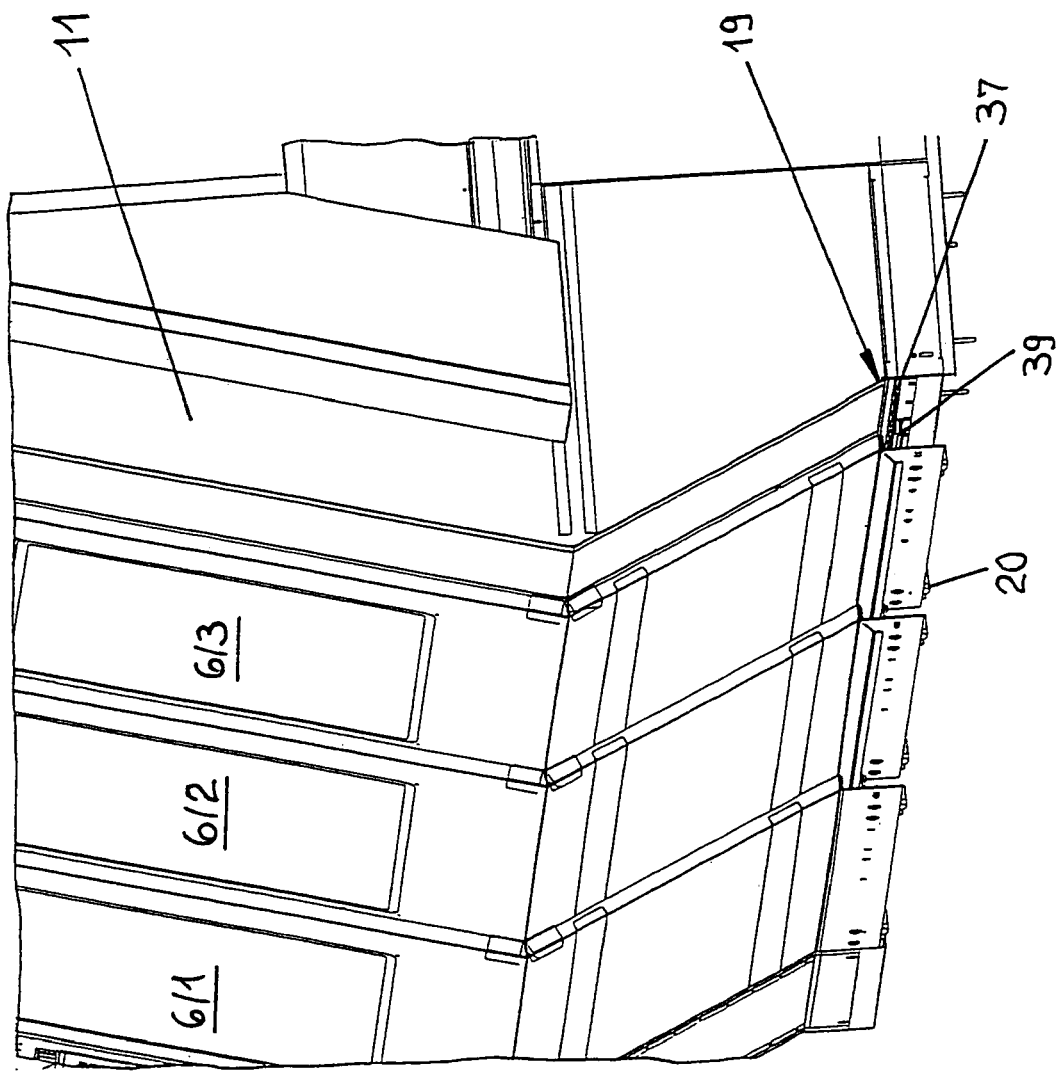
FIGS. 10 and 11 are illustrations for the guides on the lower edge of the sliding door of FIGS. 1 to 3.
Figure 11:
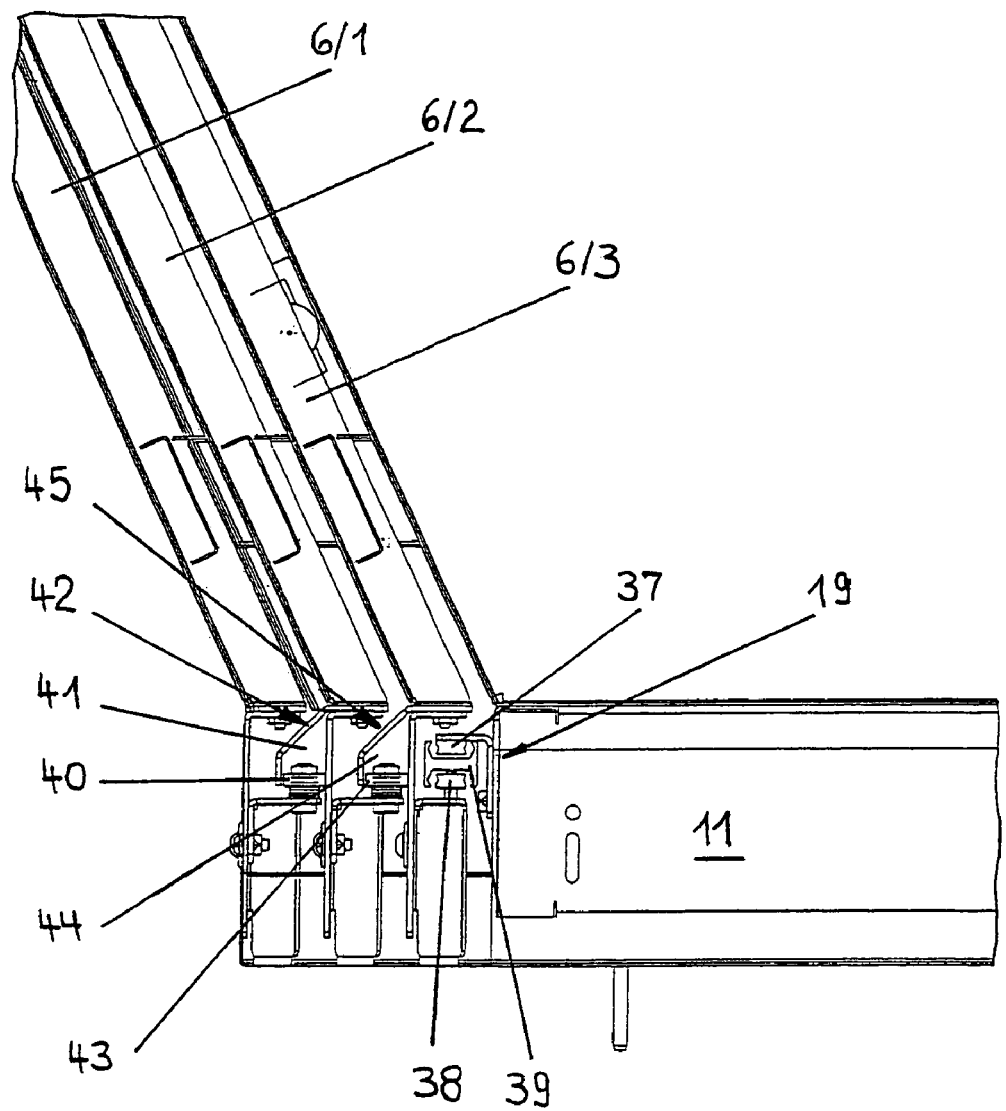

As shown in FIGS. 10 and 11, the lower telescoping guide 19 encompasses as its telescoping elements a telescope track 37 that is fastened to the gate boundary member 11, a telescoping track 38 that is connected to the bottom rim of door segment 6/3, as well as a telescoping guide element 39 that is positioned between the telescope tracks 37 and 38.

Guide rollers 40 on door segment 6/1 engage in the guide chamber 41 of an angled-profile element 42 on door segment 6/2. In corresponding fashion, door segment 6/2 travels on guide rollers 43 inside a guide chamber 44 which on its part is formed by an angled section 45 that is fastened to door segment 6/3.

The connection between the lower telescoping guide 19 and the bottom rim of door segment 6/3 is again designed with vertical clearance, thus allowing compensatory height adjustment.

Overall, the result is a guide system for the door segments 6/1, 6/2, 6/3 that offers adequate stability in every spatial direction, thus assuring specific performance conditions in the opening and closing movement of door segments 6/1, 6/2, 6/3. When the sliding door 5 is open, the gate 7 of the work area enclosure 3 is almost completely unobstructed for access; from the substructure of the laser machine tool installation 1 toward the top, there is a completely unobstructed passageway and accessibility of the workpiece support 13 is thus optimized.

Figure 12:
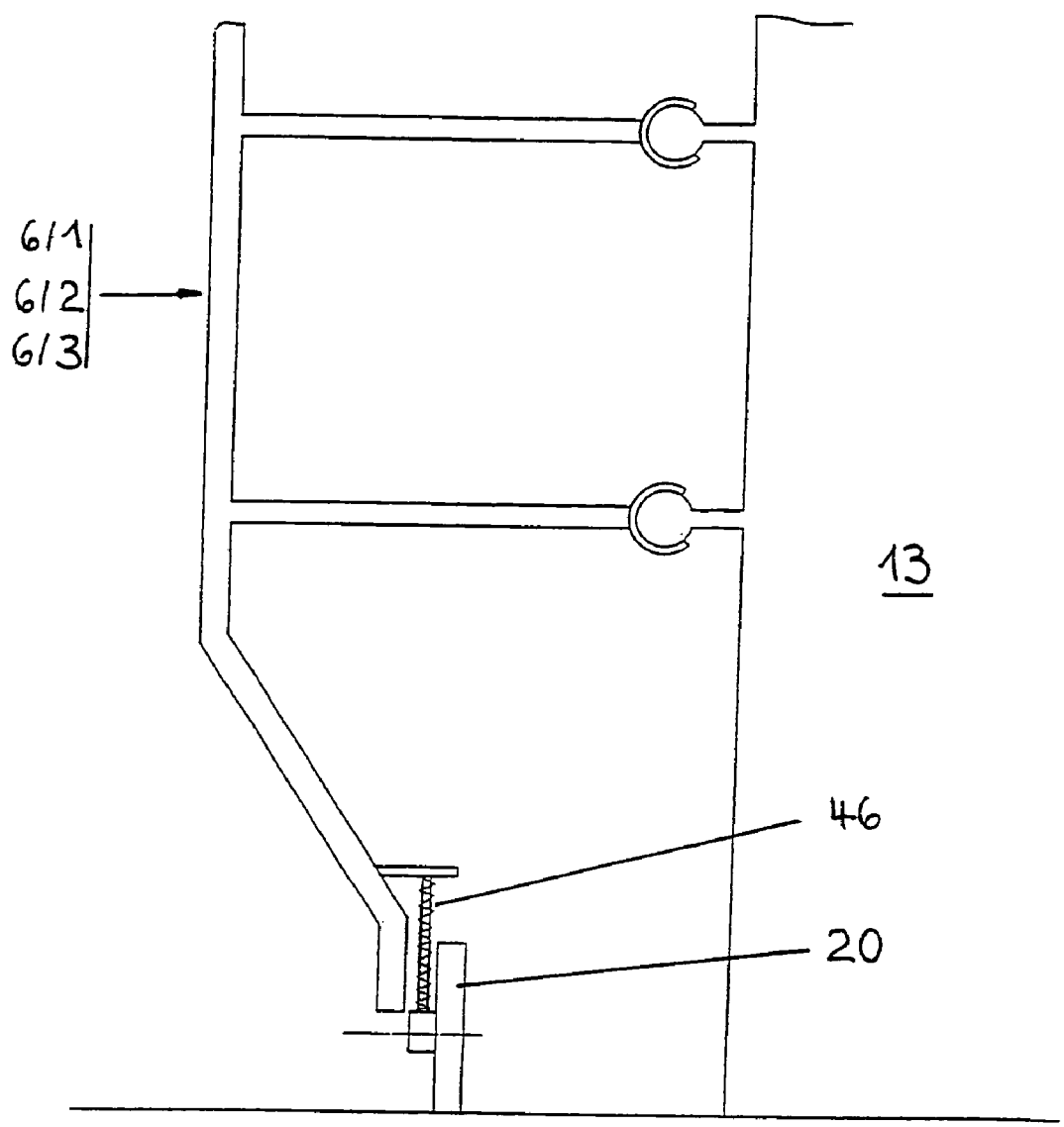
FIG. 12 depicts an alternative embodiment of the sliding door guide and support in FIGS. 1 to 11.

FIG. 12 illustrates an alternate guide system for the door segments 6/1, 6/2, 6/3 on the workpiece support 13 as well as for the support of the door segments 6/1, 6/2, 6/3 on the substructure of the laser machine tool 1. In FIG. 12, the guide system for door segments 6/1, 6/2, 6/3 on the workpiece support 13 allows no backlash. Uneven spots on the base or floor are compensated for in that the rollers 20 are mounted on the lower rim of door segments 6/1, 6/2, 6/3 with clearance in the vertical direction. In the example of FIG. 12, the rollers 20 are supported on the door segments 6/1, 6/2, 6/3 by gas pressure-loaded springs 46, which allow for movement in the vertical direction relative to the door segments 6/1, 6/2, 6/3.

Having thus described the invention, what is claimed is:

1. In a machine tool installation for the processing of workpieces including a work area (4) which accommodates a workpiece support (13), a work area enclosure (3) with a gate (7) and a plurality of door segments (6/1, 6/2, 6/3) movable in the horizontal direction between open and closed positions and which, in their open position, do not obstruct the gate (7) of the work area enclosure (3) and, in their closed position, at least partially block the gate, the door segments (6/1, 6/2, 6/3) being guided in their movement by means of at least one stationary guide element (14, 15) that extends in the direction of travel (8) of the door segments (6/1, 6/2, 6/3) over at least part of the gate width, the door segments (6/1, 6/2, 6/3) being movably supported on and in contact with a substructure of the machine tool installation (1) for movement horizontally, and, above the substructure of the machine installation (1), at least two horizontally extending stationary guide elements (14, 15), mutually offset in the vertical direction are provided to guide at least one of the door segments (6/1, 6/2, 6/3) over at least part of the gate width, said guide elements being attached only to the workpiece support (13).

2. The machine tool installation in accordance with claim 1, characterized in that the workpiece support (13) is provided with two of the horizontally extending stationary guide elements (14, 15) mutually offset in the vertical direction to guide the at least one door segment (6/1, 6/2, 6/3).

3. The machine tool installation in accordance with claim 1 characterized in that, on a side of the machine tool installation next to the gate (7), at least one fixed lateral support is provided for at least one of the door segments (6/1, 6/2, 6/3), and the at least one door segment (6/1, 6/2, 6/3) is attached to the at least one lateral support for guidance in the direction of travel (8).

4. The machine tool installation in accordance with claim 3 characterized in that the at least one fixed lateral support for the at least one door segment (6/1, 6/2, 6/3) is in the form of a fixed segment of the work area enclosure (3).

5. The machine tool installation in accordance with claim 3 characterized in that the at least one fixed lateral support for the at least one door segment (6/1, 6/2, 6/3) is a gate boundary member (11) for the work area enclosure (3).

6. The machine tool installation in accordance with claim 3 characterized in that the at least one door segment (6/1, 6/2, 6/3) is attached to the at least one fixed lateral support by at least one telescoping guide (18, 19) which is connected by a telescoping element thereof (25, 37) to the at least one fixed lateral support and by another telescoping element (26, 38) to the at least one door segment (6/1, 6/2, 6/3) and is telescopable in the direction of travel (8) of the door segments (6/1, 6/2, 6/3).

7. The machine tool installation in accordance with claim 3 in which the at least one fixed lateral support for at least one of the door segments (6/1, 6/2, 6/3) is a lateral gate boundary member (11) for the work area enclosure (3) and the at least one door segment (6/1, 6/2, 6/3) is attached to the lateral gate boundary member (11) by at least one telescoping guide (18, 19), and wherein the at least one door segment (6/1, 6/2, 6/3) is offset perpendicularly to its principal plane relative to the lateral gate boundary member (11) and that a telescoping element (26, 38) associated with the at least one door segment (6/1, 6/2, 6/3), in its direction of travel during the opening movement of the at least one door segment (6/1,

6/2, 6/3), can be moved past a telescoping element (25, 37) associated with the gate boundary member (11).

8. The machine tool installation in accordance with claim 7 characterized in that at least one door segment (6/1, 6/2, 6/3) is guided along the work support (13) in the direction of travel and is supported on the substructure of the machine installation (1) in a manner as to allow play in the vertical direction.

9. The machine tool installation in accordance with claim 7 characterized in that at least one door segment (6/1, 6/2, 6/3) is guided along the work support (13) in the direction of travel, and is attached to the fixed lateral support, while allowing play in the vertical direction.

10. A machine tool installation in accordance with claim 1 characterized by the plurality of door segments (6/1, 6/2, 6/3) being mutually offset in a direction perpendicular to their principal plane and movable in telescoping fashion between the open and closed positions.

11. A machine tool installation in accordance with claim 10 characterized in that at least one door segment (6/1, 6/2, 6/3) is guided by another door segment (6/1, 6/2, 6/3) in the direction of travel (8).

12. A machine tool installation in accordance with claim 10 in that one door segment (6/3) positioned most closely to a fixed lateral support (11), is attached to the said lateral support and is so mounted as to be guided in the direction of travel preferably by way of at least one telescoping guide (18, 19).

13. In a machine tool installation for the processing of workpieces including a work area (4) which accommodates a workpiece support (13), a work area enclosure (3) with a gate (7) and a plurality of door segments (6/1, 6/2, 6/3) movable in the horizontal direction between open and closed positions and which, in their open position, do not obstruct the gate (7) of the work area enclosure (3) and, in their closed position, at least partially block the gate, the door segments (6/1, 6/2, 6/3) being guided in their movement by means of at least one stationary guide element (14, 15) that extends in the direction of travel (8) of the door segments (6/1, 6/2, 6/3) over at least part of the gate width, the door segments (6/1, 6/2, 6/3) being movably supported on and in contact with a substructure of the machine tool installation (1) for movement horizontally, and, above the substructure of the machine installation (1), two horizontally extending stationary guide elements (14, 15), mutually offset in the vertical directions are provided to guide at least one of the door segments (6/1, 6/2, 6/3) over at least part of the gate width, said guide elements being attached only to the workpiece support (13), and on a side of the machine tool installation next to the gate (7), at least one fixed lateral support is provided for at least one of the door segments (6/1, 6/2, 6/3), and the at least one door segment (6/1, 6/2, 6/3) is attached to the at least one lateral support for guidance in the direction of travel (8), and wherein at least one door segment (6/1, 6/2, 6/3) is guided by another of the door segments (6/1, 6/2, 6/3) in the direction of travel (8).

14. The machine tool installation in accordance with claim 13, characterized in that the at least one fixed lateral support for the at least one door segment (6/1, 6/2, 6/3) is in the form of a fixed segment of the work area enclosure (3).

15. The machine tool installation in accordance with claim 13 characterized in that the at least one fixed lateral support for the at least one door segment (6/1, 6/2, 6/3) is a gate boundary member (11) for the work area enclosure (3).

16. The machine tool installation in accordance with claim 13 characterized in that the at least one door segment (6/1, 6/2, 6/3) is attached to the at least one fixed lateral support by at least one telescoping guide (18, 19) which is connected by a telescoping element thereof (25, 37) to the at least one fixed lateral support and by another telescoping element (26, 38) to the at least one door segment (6/1, 6/2, 6/3) and is telescopable in the direction of travel (8) of the door segments (6/1, 6/2, 6/3).

17. The machine tool installation in accordance with claim 13 in which the at least one fixed lateral support for at least one of the door segments (6/1, 6/2, 6/3) is a lateral gate boundary member (11) for the work area enclosure (3) and the at least one door segment (6/1, 6/2, 6/3) is attached to the lateral gate boundary member (11) by at least one telescoping guide (18, 19), and wherein the at least one door segment (6/1, 6/2, 6/3) is offset perpendicularly to its principal plane relative to the lateral gate boundary member (11) and that a telescoping element (26, 38) associated with the at least one door segment (6/1, 6/2, 6/3), in its direction of travel during the opening movement of the at least one door segment (6/1, 6/2, 6/3), can be moved past a telescoping element (25, 37) associated with the gate boundary member (11).

18. The machine tool installation in accordance with claim 17 characterized in that at least one door segment (6/1, 6/2, 6/3) is guided along the work support (13) in the direction of travel and is supported on the substructure of the machine installation (1) in a manner as to allow play in the vertical direction.

\* \* \* \* \*